United States Patent [19]

Gober

[11] Patent Number: 4,558,224

[45] Date of Patent: Dec. 10, 1985

[54] COUNTERFEIT BILL WARNING DEVICE

[75] Inventor: Jerome T. Gober, Chicago, Ill.

[73] Assignee: Imperial Inc., Chicago, Ill.

[21] Appl. No.: 498,635

[22] Filed: May 26, 1983

[51] Int. Cl.⁴ .............................................. G01N 21/64

[52] U.S. Cl. .................................................. 250/461.1

[58] Field of Search ...................... 250/271, 372, 458.1, 250/459.1, 461.1, 556; 283/89, 92

[56] References Cited

U.S. PATENT DOCUMENTS

| | | | |
|---|---|---|---|
| 2,950,799 | 8/1960 | Timms | 250/372 |
| 3,842,281 | 10/1974 | Goodrich | 250/461.1 |
| 4,061,922 | 12/1977 | Last | 250/461.1 |
| 4,277,774 | 7/1981 | Fujii et al. | 250/372 |

*Primary Examiner*—Alfred E. Smith

*Assistant Examiner*—Vincent J. Lemmo

*Attorney, Agent, or Firm*—Leydig, Voit & Mayer, Ltd.

[57] ABSTRACT

According to the invention, a device for detecting counterfeit paper currency is provided which utilizes the characteristic fluorescence of genuine paper currency to detect counterfeit paper currency. An ultraviolet lamp illuminates the paper currency of unknown origin which the currency is placed on a stage held in fixed relationship to the ultraviolet lamp by a housing. A sensor circuit responds to the fluorescent radiation from the paper currency to give a signal to an indicator which displays an indication of the fluorescence of the unknown paper currency relative to genuine paper currency. The sensor is a photoresistor and the indicator is a variable intensity light or a digital display.

12 Claims, 4 Drawing Figures

COUNTERFEIT BILL WARNING DEVICE

TECHNICAL FIELD

The invention relates to devices for detecting counterfeit paper currency. In particular, the invention relates to devices which utilize the fluorescent response of genuine paper currency to illumination by ultraviolet radiation as a means for detecting counterfeit paper currency.

BACKGROUND OF THE INVENTION

Some compositions of matter have the characteristic of absorbing invisible ultraviolet radiation and re-radiating the energy of the absorbed radiation in the visible portion of the electromagnetic spectrum. Absorption of invisible ultraviolet radiation and re-radiation of the energy as visible radiation is commonly called fluorescence. Illuminating paper currency of unknown origin with invisible ultraviolet radiation is a well known method of identifying counterfeit paper currency. Typically, counterfeit United States currency has a much greater fluorescence than genuine United States currency. This difference in the characteristic absorption of ultraviolet radiation has been useful as a means to detect counterfeit United States currency. Some countries have been known to mark a portion of their paper currency with a substance that is not ordinarily visible, but becomes visible when the material fluoresces in response to illumination by ultraviolet radiation. Accordingly, devices have been developed for commercial use which illuminate paper currency with ultraviolet radiation to enable a quick determination from the degree of fluorescence as to the genuineness of paper currency of unknown origin.

The ultraviolet illumination and fluorescence method of determining the genuineness of paper currency has become increasingly important with the development of improved methods of reproducing the engravings of paper currency. In the past counterfeit paper currency often would be of a lesser print quality than genuine paper currency. This evidence coupled with an unusually high fluorescence characteristic (in U.S. paper currency) was enough information for the user of the ultraviolet illumination method to make a reliable determination that a particular paper bill was counterfeit. Today unfortunately, because of the easy availability of improved printing techniques, the inferior printing quality of counterfeit paper currency sometimes cannot be detected by the nonexpert. Therefore, an accurate determination of the degree of fluorescence of paper currency has increased in importance.

In counterfeit United States paper currency there are varying degrees of fluorescence depending on the material used. As stated earlier, genuine U.S. paper currency has a relatively low level of fluorescence. In the past ultraviolet radiation devices have depended on the user's visual determination of the level of fluorescence to detect counterfeit currency. Such a method of detection is open to subjective influences on the user which reduce the accuracy and reliability of the ultraviolet radiation devices.

SUMMARY OF THE INVENTION

It is an object of this invention to provide an ultraviolet counterfeit paper currency alert system which gives an accurate, reliable and easily interpreted indication of the liklihood paper currency is counterfeit.

It is a further object of this invention to provide an ultraviolet counterfeit paper currency alert system which gives an indication of the illuminated currency's fluorescence relative to the known fluorescence of genuine paper currency.

It is yet another object of this invention to provide an ultraviolet counterfeit paper currency alert system which gives an indication of the liklihood of genuineness without requiring visual evaluation of the fluorescence of the illuminated paper currency.

Other objects and advantages of the invention will be apparent from the following detailed description.

Although the invention will be described in connection with certain preferred embodiments, it will be understood that it is not intended to limit the invention to those particular embodiments. On the contrary, it is intended to cover all alternatives, modifications and equivalents that may be included within the spirit and scope of the invention as defined by the appended claims.

According to the invention, a device for detecting counterfeit paper currency is provided which utilizes the characteristic fluorescence of genuine paper currency to detect counterfeit paper currency. An ultraviolet lamp illuminates the paper currency of unknown origin when the currency is placed on a stage held in fixed relationship to the ultraviolet lamp by a housing. A sensor circuit responds to the fluorescent radiation from the paper currency to give a signal to an indicator which displays an indication of the fluorescence of the unknown paper currency relative to genuine paper currency. The sensor is a photoresistor and the indicator is a variable intensity light or a digital display.

PREFERRED EMBODIMENT OF THE INVENTION

Figure 1:
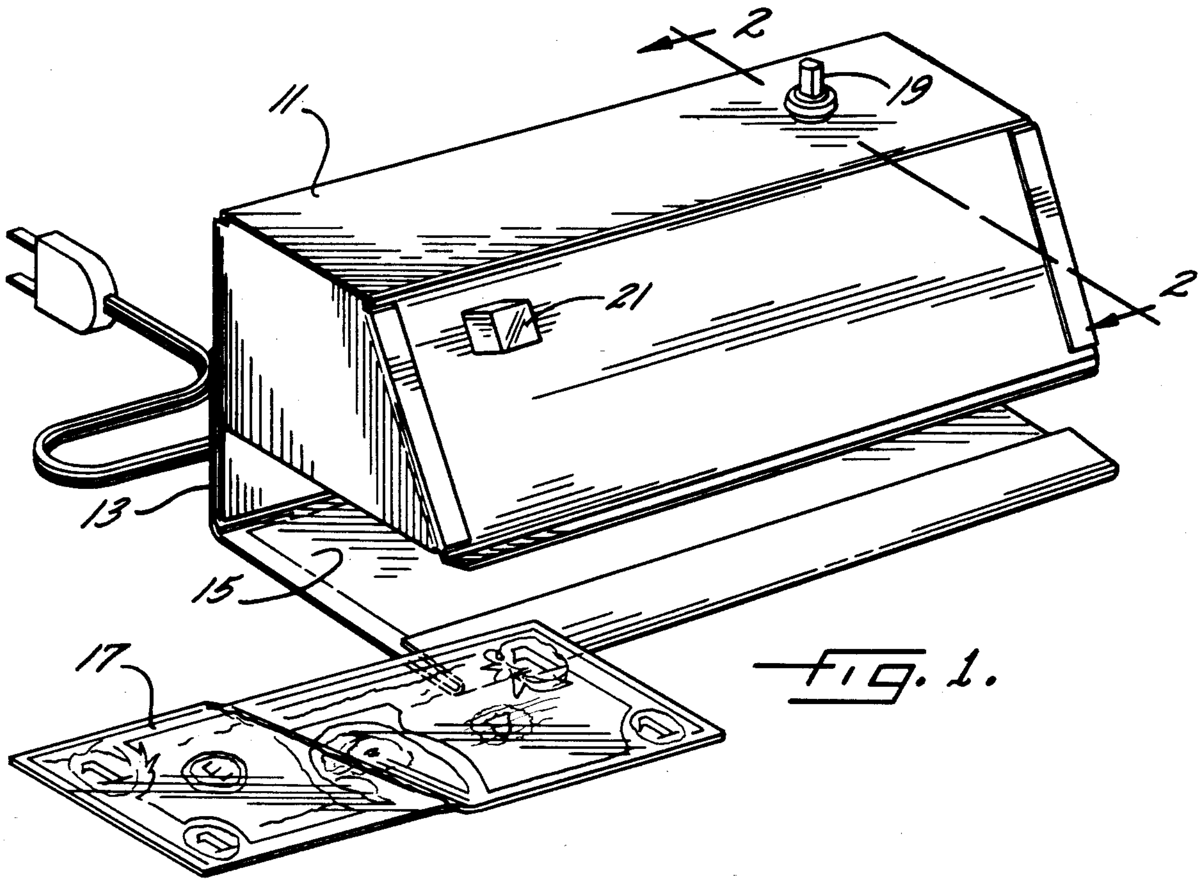
FIG. 1 is a perspective view of the ultraviolet counterfeit paper currency alert system according to the invention.

FIG. 1 is a perspective view of the ultraviolet counterfeit paper currency alert system according to the invention. The system construction consists of two main portions. The first portion is an ultraviolet lamp housing 11 which secures a lamp in position within the housing and also serves to direct the radiation of the lamp onto the paper currency. All the electronic components of the system are contained in the upper portion of the housing 11. A support wall 13 holds the housing 11 in correct placement over a stage 15. The stage 15 is a flat surface which receives the paper currency 17 to be illuminated by the ultraviolet lamp. In addition to providing a holding surface for currency the stage also provides physical stability by maintaining the housing 11 and lamp in an upright position relative to its supporting surface (i.e., a table or deck). To turn the fluorescent lamp on and off a switch 19 is mounted on the top portion of the housing 11. For indicating to the user the degree of fluorescence relative to genuine paper currency, an indicator 21 is positioned on the front of the housing 11.

Figure 2:
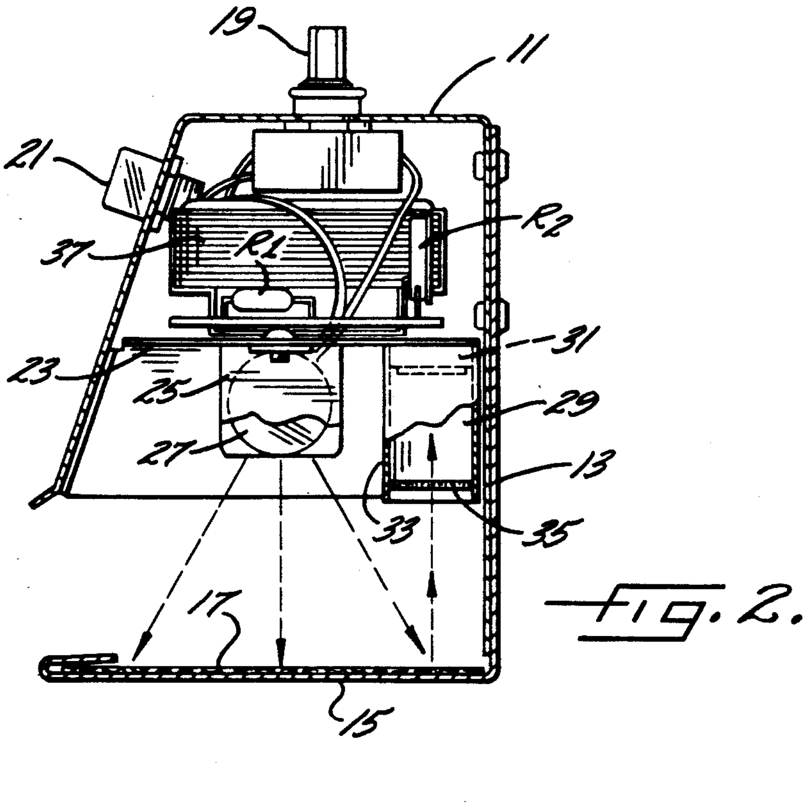
FIG. 2 is a cross section of the system in FIG. 1 along the line 2—2 and in the direction of the arrows.

FIG. 2 is a cross-sectional view of the system in FIG. 1 along the line 2—2 and in the direction of the arrows. A support plate 23 is secured to the inside of housing 11 by rivets or other suitable means. The support plate 23 secures the ultraviolet lamp fixture 25 in a fixed position to enable an ultraviolet lamp 27 to be inserted into the fixture 25. The support plate 23 and housing 11 interact to form a surface which directs the ultraviolet radiation toward the stage 15. A sensing device 29 which is responsive to the fluorescent radiation of currency placed on the stage 17 is also held in a fixed position by the support plate 23.

Preferably, the sensing device 29 comprises a photocell 31 mounted on the support plate 23. A piece of cylindrical tubing 33 is positioned over the photocell to eliminate any substantial effect on the photocell 31 by direct illumination by the ultraviolet lamp 27. In order to assure that no direct ultraviolet radiation reaches the photocell 31 the length of the tubing 33 should be long enough to bring the open end of the tubing to a vertical level which is as low or lower than the lowest portion of the ultraviolet lamp. To further enhance the detection ability of the photocell, the open end of the tubing 33 is covered by a polarizing material 35. The result of the combination of tubing 33 and polarizing material 35 is a sensing device 29 which is highly responsive to fluorescent radiation sourcing directly from the paper currency positioned on the stage 15. The cross-sectional view in FIG. 2 also shows a ballast choke 37 and resistors R1 and R2 whose functions will be explained in connection with FIG. 3.

Although the sensing device 29 is shown positioned along the back wall of the housing 11, the sensing device 29 and the ultraviolet lamp 27 can be rearranged on support plate 23 to a position which best utilizes the fluroescence of the bills to be inspected. For instance, some paper currency may show particular sensitivity to ultraviolet light in an area left or right of the bill's center. Accordingly, for inspection of such bills, the sensing device should be positioned such that it is directly over these most sensitive areas when a bill is placed on the stage 15. In summary, it is in accordance with the invention that the position of the sensing device can be moved on support plate 23 to any position to facilitate receiving fluroescence from the most ultraviolet sensitive area of the bill.

Figure 3:
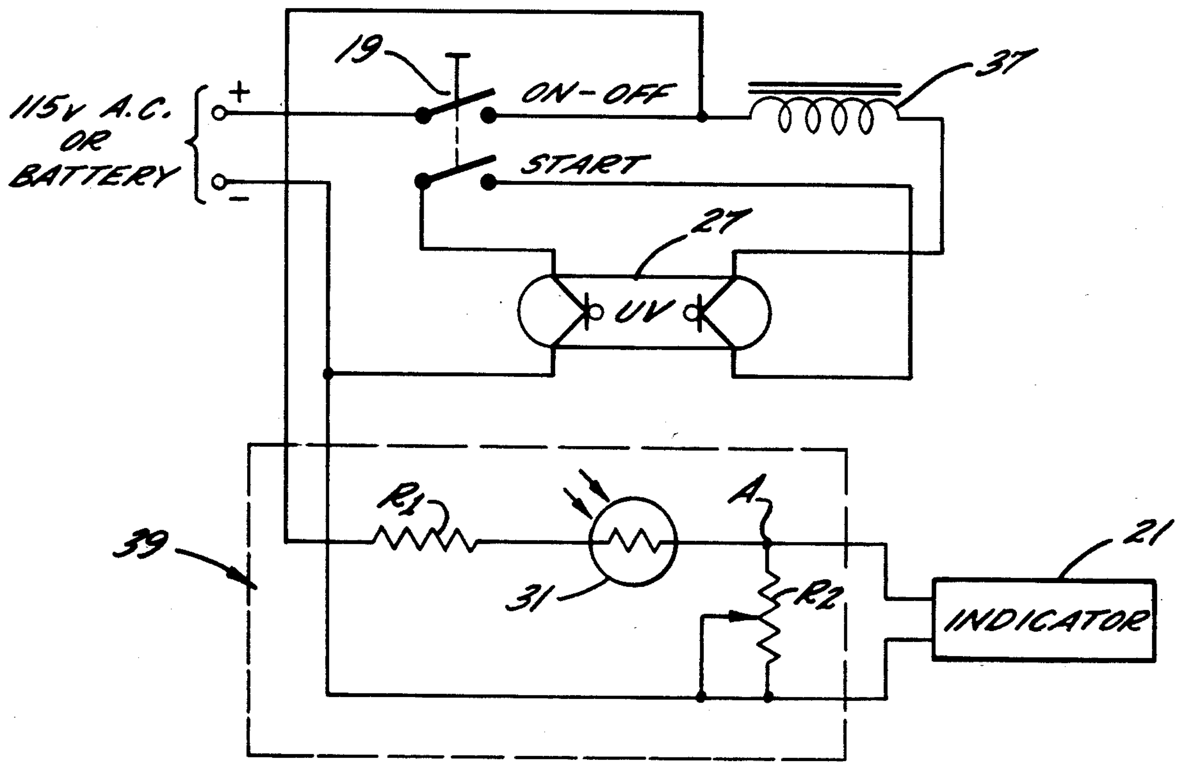
FIG. 3 is a circuit diagram of the sensor and indicator for the system according to the invention.

FIG. 3 is a circuit diagram of the ultraviolet counterfeit paper currency alert system according to the invention. The circuitry can be divided into the ultraviolet lamp circuit and the sensor/indicator circuit. The ultraviolet lamp circuit includes an ultraviolet lamp 27, double-throw switch 19 and ballast choke 37 which function in the same well known manner as in conventional fluorescent lamp circuits. As in most conventional fluorescent switches the switch 19 closes both the on-off contact and the start contact when the switch 19 is depressed. The closing of the on-off contact causes AC power to be delivered to the ultraviolet lamp 27 while the closing of the start contact activates auxillary electrodes in the ultraviolet lamp 27 which enable easier starting of current conduction through the lamp. Releasing the switch 19 from its depressed position leaves the on-off contact closed but opens the start contact. Ballast 37 current limits the ultraviolet lamp circuit which prevents an overcurrent condition from occurring during start-up of the ultraviolet lamp.

The sensor/indicator circuit comprises a voltage divider network 39 and an indicator 21 sensitive to a node A in the voltage divider network. The voltage divider network 39 comprises resistors R1, variable resistor R2 and photocell resistor 31. In order to sense the changing resistance of the photocell resistor 31. The indicator 21 is connected in parallel with the variable resistor R2. As an operating characteristic the photocell resistor 31 has a resistance value which is inversely porportional to the amount of fluorescent radiation illuminating it. Therefore, the higher the fluorescence of the paper currency 17 on the stage 15, the lower the resistance of the photocell resistor 31. Accordingly, the greater the fluorescence illuminating the photocell, the greater the voltage at divider node A.

Since the voltage at divider node A is the voltage supplied to the indicator, the response of the indicator is directly proportional to the degree of fluorescence. Therefore, any indicator which can visually indicate the voltage potential across the variable resistor R2 can serve as the indicator 21. Also within the scope of the invention would be a sound indicator which would be of great value to users who are visually imparied. Preferably the indicator 21 is a neon lamp. But many other visual indicator can be used as a substitute. As an example, a digital display module which converts the voltage level at the divider node A to a decimal display using a group of seven segment displays would be a possible indicator.

Since the fluorescence of the paper currency 19 increases the voltage across variable resistor R2 the variable resistor R2 can be adjusted in value so that the node A reaches a threshold voltage for the indication at a fluorescence incident on photocell which is greater than the fluorescence commonly seen in genuine paper currency. As the degree of fluorescence from the paper currency increases the voltage across R2 increases (the voltage at node A) and the indicator voltage becomes greater than threshold voltage. As a result, the indicator 21 informs the user that the fluorescence of the unknown origin paper currency is greater than normal and should be of suspect genuineness. The response of indicator 21 is preferably scaled so that a fluorescence which is only slightly greater than that of a genuine bill (as determined by the voltage setting at node A by variable resistor R2) will result in only a slight response of the indicator. In practice, with a neon lamp indicator, the greater the flourescense of a paper currency specimen the greater the light intensity of the neon lamp. Similarly with a digital display module, the module and variable resistor R2 can be adjusted so that the module reads zero in response to the fluorescence of genuine paper currency. In a digital display indicator, the greater the degree of fluorescence, the greater the numerical value displayed by the indicator.

The circuitry of the alert system as shown in FIG. 3 can be powered by either 110 volt line voltage or battery. The ultraviolet lamp 27, and possibly the indicator 21 too, require AC voltages at levels greater than most practical portable batteries. To provide for proper system operation when portable battery power is used, a battery booster/chopper circuit shown in FIG. 4 is provided with the system.

Figure 4:
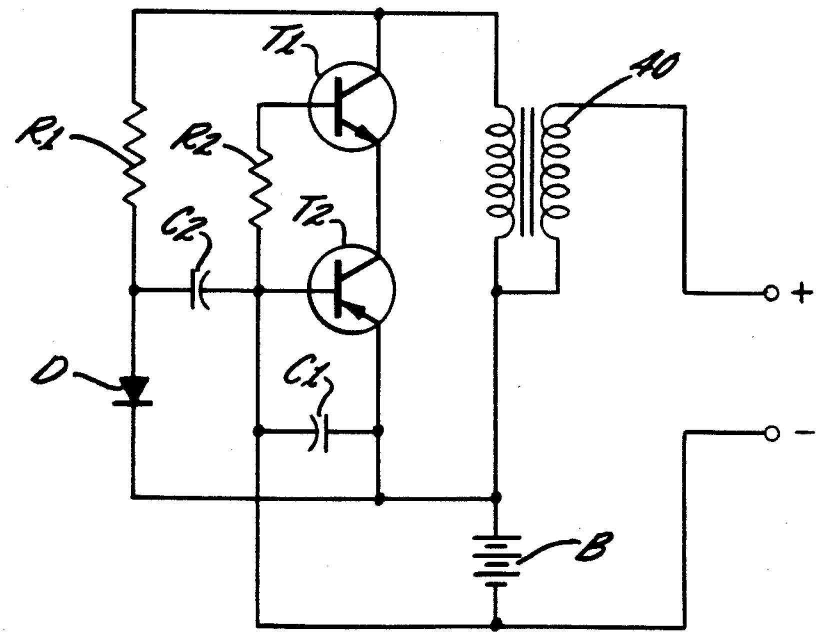
FIG. 4 is a circuit diagram of a circuit for adapting battery power to the system according to the invention.

Referring to FIG. 4, the battery booster/chopper circuit includes transistors $T_1$ and $T_2$ connected in an astable network by way of resistors $R_1$ and $R_2$, capacitors $C_1$ and $C_2$ and diode D. It should be understood that the particular astable multivibrator circuit shown in FIG. 4 is well known and many other configurations could also function to provide the chopper portion of the circuit. A transformer 40 provides the voltage booster function. The secondary winding of transformer 40 is chosen to give the ultraviolet lamp 27 sufficient voltage to maintain a current through the lamp and, if necessary, to give sufficient voltage to the indicator 21 (e.g. a neon lamp).

The battery B is shown in FIG. 4 as directly connected to the astable multivibrator circuitry. To prolong battery life, a switch can be placed between one of the battery terminals and the astable circuitry. One possible arrangement would be for the switch to be ganged with the on-off/start switch in FIG. 3.

In summary, the user of the ultraviolet counterfeit paper currency alert system according to the invention is able to easily and reliably determine the likelihood of the paper currecy 17 being counterfeit. By observing the intensity of the neon lamp, or by observing the numerical value of a digital display, or by observing some other indicator means, the user can make an objective determination of the likelihood of the genuineness of the paper currency 17.

I claim as my invention:

1. A device for detecting counterfeit paper currency utilizing the characteristic fluorescence of genuine paper currency, said device comprising, an ultraviolet lamp for illuminating paper currency to be tested, a housing supporting said ultraviolet lamp, a stage supporting the paper currency, said stage being mounted to the housing and illuminated by the ultraviolet lamp, a sensor mounted within the housing and responsive to the fluorescent radiation from the paper currency for providing a variable signal proportional to the intensity of the fluorescence, and means responsive to the variable signal from said sensor for providing a physical indication of the degree of fluorescence of the paper currency including adjustable means for providing a first threshold signal corresponding to the fluorescence of genuine paper currency, means for providing a second signal corresponding to the fluorescence of the illuminated paper currency, and a variably responsive indicator which responds to second signal in excess of the first threshold signal.

2. A device for detecting counterfeit paper currency as set forth in claim 1 wherein said sensor comprises a photocell sensitive to the degree of fluorescent radiation from illuminated paper currency.

3. A device for detecting counterfeit paper currency as set forth in claim 1 wherein said indicator is a variable intensity light.

4. A device for detecting counterfeit paper currency as set forth in claim 1 wherein said indicator is a digital display.

5. A device for detecting counterfeit paper currency as set forth in claim 1 wherein said sensor causes a variable voltage proportional to the intensity of the fluorescence of illuminated paper currency to be delivered to said indicator.

6. A device for detecting counterfeit paper currency as set forth in claim 1 wherein said indicator means and said sensor comprises a voltage divider circuit.

7. A device for detecting counterfeit paper currency as set forth in claim 6 wherein said voltage divider circuit includes a photocell resistor which is responsive to the fluorescence of illuminated paper currency.

8. A device for detecting counterfeit paper currency as set forth in claim 6 wherein said indicator is responsive to a voltage node in said voltage divider circuit.

9. A device for detecting counterfeit paper currency as set forth in claim 8 wherein the voltage at said voltage node in said voltage divider circuit is proportional to the fluorescence of illuminated paper currency.

10. A device for detecting counterfeit paper currency as set forth in claim 8 wherein said indicator has a threshold voltage and said adjustable means includes a variable resistance of said voltage divider circuit for adjusting the voltage level at said voltage node to said threshold voltage.

11. A device for detecting counterfeit paper currency as set forth in claim 10 wherein said voltage node of said voltage divider network exceeds said threshold voltage only in response to fluorescence from illuminated paper currency which is greater than the fluorescence of genuine currency.

12. A device for detecting counterfeit paper currency as set forth in claim 1 wherein said sensor comprises a photocell sensitive to the fluorescent radiation from illuminated paper currency and a polarizing lens positioned between said stage and said photocell.

* * * * *